United States Patent
Chu et al.

(10) Patent No.: US 10,495,138 B2
(45) Date of Patent: Dec. 3, 2019

(54) HINGE ASSEMBLY WITH COMPRESSIBLE SLEEVE

(71) Applicant: Helwett-Packard Development Company, L.P., Houston, TX (US)

(72) Inventors: Chia Hua Chu, Taipei (TW); Chin-Chang Ho, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 3 days.

(21) Appl. No.: 15/514,443

(22) PCT Filed: Sep. 29, 2014

(86) PCT No.: PCT/US2014/058092
§ 371 (c)(1),
(2) Date: Mar. 24, 2017

(87) PCT Pub. No.: WO2016/053249
PCT Pub. Date: Apr. 7, 2016

(65) Prior Publication Data
US 2017/0298982 A1 Oct. 19, 2017

(51) Int. Cl.
*G06F 1/16* (2006.01)
*F16C 11/04* (2006.01)
(Continued)

(52) U.S. Cl.
CPC .............. *F16C 11/04* (2013.01); *E05D 3/02* (2013.01); *E05D 11/084* (2013.01);
(Continued)

(58) Field of Classification Search
CPC ......... F16C 11/04; F16M 11/22; F16M 11/10; F16M 2200/041; G06F 1/1616;
(Continued)

(56) References Cited

U.S. PATENT DOCUMENTS 5,037,231 A * 8/1991 Kitamura ................ F16C 11/10
16/299
5,464,083 A 11/1995 Arnold
(Continued)

FOREIGN PATENT DOCUMENTS

CN 2876421 Y 3/2007
KR 10-2002-0083970 A 11/2002
(Continued)

OTHER PUBLICATIONS

HG-TQA One Way Torque Hinge, 2014 Sugatsune USA, pp. 1-4, Available at: <sugatsune.com/products/.

*Primary Examiner* — Jinhee J Lee
*Assistant Examiner* — Sagar Shrestha
(74) *Attorney, Agent, or Firm* — HP Inc. Patent Department

(57) ABSTRACT

Examples disclosed herein relate to a hinge assembly with a compressible sleeve. In one example, a base member is coupled to an upright member via a hinge assembly. In an example, the hinge assembly include a first securing member, a second securing member including a shaft coupled to the first securing member; a compressible sleeve to engage the shaft, and a spring coupled to the first securing member. In an example, the spring is to engage the compressible sleeve and apply a compressive force on the sleeve in response to a rotational movement of the hinge assembly in a first direction and reduce a compressive force when the hinge assembly is rotated in a second direction.

19 Claims, 4 Drawing Sheets

(51) Int. Cl.
*F16M 11/10* (2006.01)
*E05D 11/08* (2006.01)
*E05D 3/02* (2006.01)
*E05D 11/10* (2006.01)
*F16M 11/22* (2006.01)
*E05D 5/14* (2006.01)

(52) U.S. Cl.
CPC ......... *E05D 11/1064* (2013.01); *F16M 11/10* (2013.01); *F16M 11/22* (2013.01); *G06F 1/1616* (2013.01); *G06F 1/1637* (2013.01); *G06F 1/1681* (2013.01); *E05D 2005/145* (2013.01); *E05Y 2800/344* (2013.01); *E05Y 2900/606* (2013.01); *F16M 2200/041* (2013.01)

(58) Field of Classification Search
CPC ....... G06F 1/1637; G06F 1/1681; E05D 3/02; E05D 11/1064; E05D 11/084; E05D 2005/145; E05Y 2900/606; E05Y 2800/344; Y10T 16/53828
USPC ..... 16/277, 285, 304, 307, 342; 361/679.01, 361/679.21, 679.22, 679.26, 679.27, 361/679.28, 807
See application file for complete search history.

(56) References Cited

U.S. PATENT DOCUMENTS

| | | | |
|---|---|---|---|
| 5,467,504 A | 11/1995 | Yang | |
| 5,566,048 A * | 10/1996 | Esterberg | G06F 1/1616 16/307 |
| 5,749,124 A | 5/1998 | Lu | |
| 5,771,539 A * | 6/1998 | Wahlstedt | F16D 7/022 16/285 |
| 6,601,269 B2 | 8/2003 | Oshima et al. | |
| 6,779,234 B1 * | 8/2004 | Lu | G06F 1/1616 16/334 |
| 7,513,011 B2 * | 4/2009 | Lu | G06F 1/1601 16/337 |
| 2002/0174519 A1 | 11/2002 | Huang | |
| 2003/0223188 A1 | 12/2003 | Ha et al. | |
| 2004/0205933 A1 * | 10/2004 | Hsieh | G06F 1/162 16/277 |
| 2005/0102796 A1 * | 5/2005 | Lee | G06F 1/1601 16/342 |
| 2005/0108854 A1 * | 5/2005 | Lee | F16M 11/10 16/340 |
| 2005/0172453 A1 | 8/2005 | Duffy | |
| 2006/0032020 A1 * | 2/2006 | Duan | G06F 1/1616 16/288 |
| 2006/0085947 A1 * | 4/2006 | Ge | H04M 1/0216 16/303 |
| 2007/0039135 A1 * | 2/2007 | Duan | H04M 1/0216 16/330 |
| 2007/0136994 A1 * | 6/2007 | Hu | F16M 11/10 16/340 |
| 2008/0034543 A1 * | 2/2008 | Hsu | F16M 11/10 16/346 |
| 2009/0031531 A1 * | 2/2009 | Chang | G06F 1/1616 16/333 |
| 2009/0183440 A1 * | 7/2009 | Cheng | F16M 11/10 52/101 |
| 2010/0086518 A1 | 4/2010 | Wang et al. | |
| 2010/0096518 A1 * | 4/2010 | Wang | E05D 11/087 248/125.7 |
| 2010/0281653 A1 * | 11/2010 | Lin | G06F 1/1616 16/285 |
| 2011/0146028 A1 * | 6/2011 | Lee | G06F 1/1681 16/319 |
| 2012/0102675 A1 * | 5/2012 | Lee | G06F 1/1681 16/243 |
| 2012/0192380 A1 * | 8/2012 | Huang | D06F 39/14 16/319 |
| 2015/0092335 A1 * | 4/2015 | Patrick | G06F 1/1681 361/679.27 |
| 2015/0114782 A1 * | 4/2015 | Saito | F16D 7/022 192/31 |

FOREIGN PATENT DOCUMENTS

| | | |
|---|---|---|
| TW | 201019832 | 11/1997 |
| TW | 202807 | 11/2001 |

* cited by examiner

HINGE ASSEMBLY WITH COMPRESSIBLE SLEEVE

BACKGROUND

Hinges are used to allow to members attached thereto to rotate about a common axis. Hinges are often used to allow a first member to rotate about the axis while the second member is secured.

BRIEF DESCRIPTION OF THE DRAWINGS

The following detailed description references the drawings, wherein.

DETAILED DESCRIPTION

Figure 1:
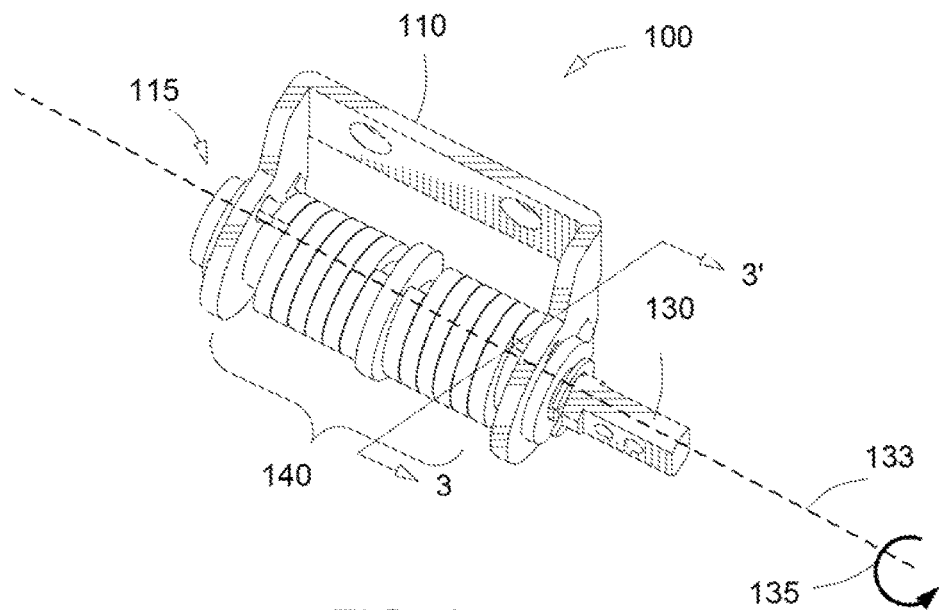
FIG. 1 is a schematic front perspective view of a hinge assembly, according to an example.

In the following discussion and in the claims, the terms "including" and "comprising" are used in an open-ended fashion, and thus should be interpreted to mean "including, but not limited to . . . ." Also, the term "couple" or "couples" is intended to include suitable indirect and/or direct connections. Thus, if a first component is described as being coupled to a second component, that coupling may, for example, be: (1) through a direct electrical or mechanical connection, (2) through an indirect electrical or mechanical connection via other devices and connections, (3) through an optical electrical connection, (4) through a wireless electrical connection, and/or (5) another suitable coupling. The term "approximately" as used herein to modify a value is intended to be determined based on the understanding of one of ordinary skill in the art, and can, for example, mean plus or minus 10% of that value.

The following discussion is directed to various examples of the disclosure. Although one or more of these examples may be preferred, the examples disclosed should not be interpreted, or otherwise used, as limiting the scope of the disclosure, including the claims. In addition, the following description has broad application, and the discussion of any example is meant only to be descriptive of that example, and not intended to intimate that the scope of the disclosure, including the claims, is limited to that example.

As used herein, an "electronic device" may be a desktop computer, laptop (or notebook) computer, workstation, tablet computer, all-in-once computer, mobile phone, smart device, television, phablet, or other processing device or equipment. A "torque" refers to a force to rotate an object about an axis. By way of illustration, a torque is applied by the force of gravity to an object which may rotate about an axis perpendicular or partially perpendicular with the force of gravity on the earth. Such a torque may result in the object rotating towards the earth about its rotational axis.

Hinges are used in many devices to hold an upper member at a relative angle with respect to a lower member. A spring may be used in a hinge to store energy and provide counter-torque to the torque applied by the force of gravity to hold the upper member at the angle. In such a hinge, the counter-torque provided by the spring may apply in all directions of rotation. However, counter-torque from a spring may require a greater force be applied when rotating the upper member in a desired direction.

To address these issues, in the examples described herein, a hinge assembly to provide greater counter-torque in one direction is provided using a spring to apply a compressive force on a compressible sleeve to resist rotational motion in a first direction. In a second rotational direction opposite the first rotational direction, the spring is uncompressed and the resistance to rotational motion in the second direction is reduced. In this manner, examples described herein may significantly reduce the force required to rotate an object about a hinge in a first direction while maintaining the force needed to rotate the object about the hinge in the opposite rotational direction.

Figure 2:
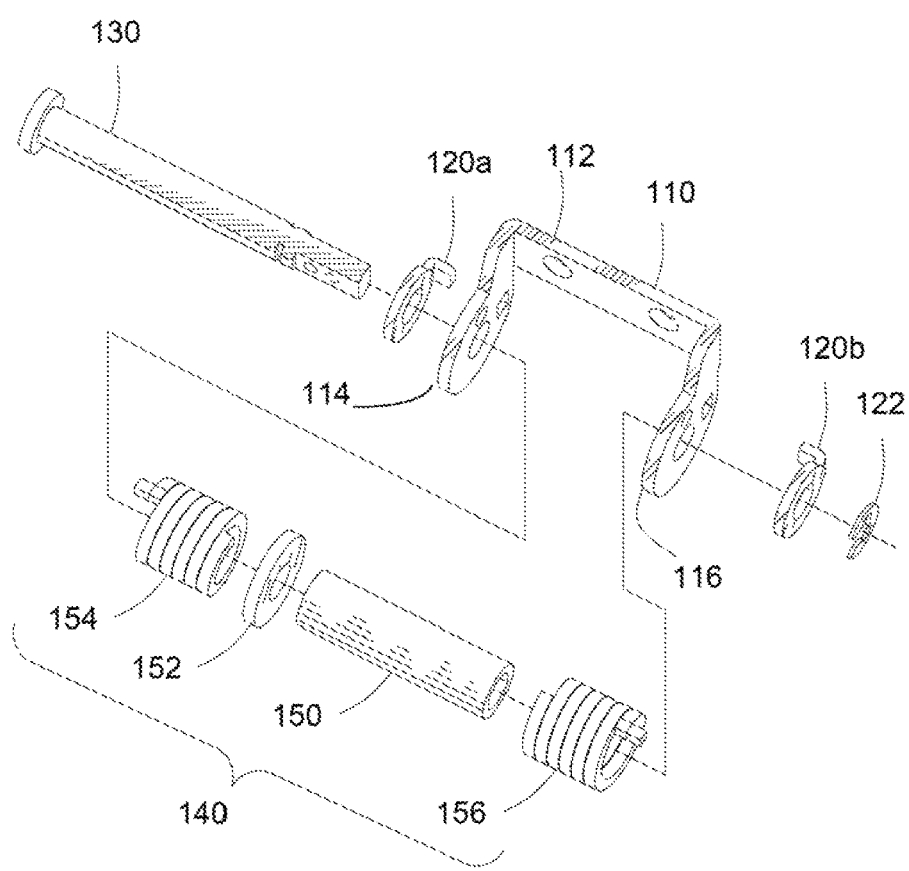
FIG. 2 is a schematic exploded view of the hinge assembly of FIG. 1 according to an example.

Referring now to the drawings, FIG. 1 illustrates a schematic front perspective view of a hinge assembly 100. FIG. 2 illustrates a schematic exploded view of the hinge assembly 100 of FIG. 1. Hinge assembly 100 includes first securing member 110 and second securing member 115. Second securing member 115 may include a shaft 130, a first washer 120a, a second washer 120b, a locking nut 122, and a resistance member 140.

Second securing member 115 is coupled to first securing member 110 via shaft 130. First securing member 110 includes a first surface 112, a second surface 114, and a third surface 116. First surface 112 includes through holes to enable coupling of the first securing member 110 to a first surface of a device. Second surface 114 and third surface 116 are disposed parallel to each other and perpendicular to first surface 112 and on opposite edges of first surface 112. Shaft 130 may be threaded through a first hole in second surface 114 and a first hole in third surface 116. In an example, shaft 130 includes a first through-hole and a second through-hole to couple shaft 130 to a second surface of the device. However, the examples are not limited thereto and first securing member 110 and second securing member 115 may be coupled to a first surface of a device and a second surface of a device, respectively, via any coupling mechanism (e.g., welding, bonding, etc.).

In some implementations, first washer 120a is to engage shaft 130 such that first washer 120a abuts an outer side of second surface 114. First washer 120a is coupled to second surface 114 via a flange projecting from first washer 120a to engage a second hole in second surface 114. Second washer 120b engages shaft 130 such that second washer 120b abuts an outer side of third surface 116. Second washer 120b is coupled to third surface 116 and is coupled thereto via a flange projecting from second washer 120b to engage a second hole in third surface 116. Locking washer 122 engages shaft 130 to abut second washer 120b. Locking washer 122 is to secure second securing member 115 to first securing member 110. In an example, locking washer 122 may be replaced with any other mechanism to secure second securing member 115 to first securing member 110, such as a locking nut, etc.

Referring now to FIG. 2, in some implementations, resistance member 140 includes a compressible sleeve 150, a washer 152, a first spring 154, and a second spring 156.

Compressible sleeve 150 is coupled to shaft 130. In an example, an inner dimension of compressible sleeve 150 is dimensioned to be mated to an outer surface of shaft 130. First spring 154 is coupled to compressible sleeve 150 and second surface 114 of first securing member 110. An inner dimension of first spring 154 is dimensioned to be mated to an outer surface of compressible sleeve 150. First spring 154 is coupled to first surface 114 of first securing member 110 via a flange extending therefrom and threaded through a third hole of second surface 114. In an example, second spring 156 is coupled to compressible sleeve 150 and third surface 116 of first securing member 110. An inner dimension of second spring 156 is dimensioned to be mated to an outer surface of compressible sleeve 150. Second spring 156 is coupled to third surface 116 of first securing member 110 via a flange extending therefrom and threaded through a third hole of the third surface 116. Washer 152 is disposed to engage compressible sleeve 150 between first spring 154 and second spring 156. Although shown with two springs in FIG. 2, in some implementations, a single spring may be disposed on compressible sleeve 150, as described with reference to FIGS. 7-8 below.

Figure 3:
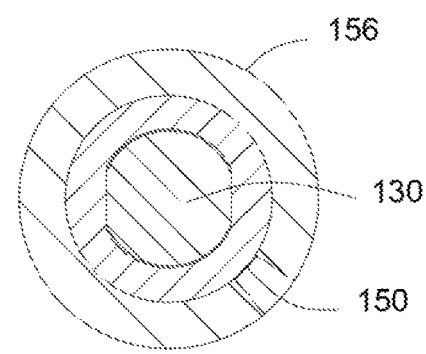
FIG. 3 is a sectional view of a resistance member of FIG. 1 taken along 3-3' according to an example.

FIG. 3 illustrates a cross sectional view of resistance member 140 taken along, line 3-3' of FIG. 1. As illustrated in greater detail in FIG. 3, in some implementations, shaft 130 does not have a circular cross-section along line 3-3'. However, compressible sleeve 150 is dimensioned to securely engage and be mated to the outer surface of shaft 130. Similarly, second spring 156 and first spring 154 (not shown in FIG. 3) are dimensioned to securely engage and be mated to the outer surface of compressible sleeve 150. It would be understood that shaft 130 having an irregular cross-section may allow compressible sleeve 150 to more effectively engage the outer surface of shaft 130 to apply a compressive force thereto when compared to a circular cross-section of shaft 130. As used herein, a "compressive force" refers to a force applied on a component to reduce the component's size. However, in some implementations, shaft 130 may have a circular cross-section along line 3-3'. In the example of FIG. 3, the outer surface of compressible sleeve 150 has a circular cross-section, but the examples are not limited thereto and the outer surface of compressible sleeve 150 may be of any shape to be securely mated to an inner dimension of first spring 154 and second spring 156. Similarly, although the inner dimension of second spring 156 is shown with a circular cross-section, the examples are not limited thereto and the inner dimension of second spring 156 may be of any cross-sectional shape to be mated to the outer surface of compressible sleeve 150. In such examples, compressible sleeve 150 may be composed of any material which may be elastically deformable to apply a compressive force on shaft 130, such as a plastic or rubber material, for example, a polyester-based thermoplastic polyurethane (TPU), polyether-based TPU, a thermoplastic elastomers (TIDE) rubber, Polycarbonate/Acrylonitrile Butadiene Styrene (PC/ABS), etc.

Referring now to FIGS. 1-3, in some implementations, an inner dimension of first spring 154 and second spring 156 may be uniform. In such an example it will be understood that when a rotational force is applied to first spring 154 about a rotational axis 133 in a first direction 135 by first securing member 110, an inner diameter of a first coil of first spring 154 is reduced thereby reducing the inner diameter of each subsequent coil in first spring 154 and applying a uniform compressive force on compressible sleeve 150 along the entire length of first spring 154. Similarly, in such an example, when a rotational force is applied to second spring 156 about rotational axis 133 in first direction 135 by first securing member 110, an inner diameter of a first coil of second spring 156 is reduced thereby reducing the inner diameter of each subsequent coil in second spring 156 and applying a uniform compressive force on compressible sleeve 150 along the entire length of second spring 156.

In the examples, resistance member 140 is securely engaged to shaft 130 to provide a resistance to rotational movement of the first securing member 110 about rotational axis 133 in first direction 135. As first securing member 110 is rotated about rotational axis 133, first spring 154 coupled to second surface 114 and second spring 156 coupled to third surface 116 are compressed to apply a compressive force on compressible sleeve 150. In such an example, when first securing member 110 is rotated in a direction opposite to first direction 135, first spring 154 and second spring 156 are uncompressed to reduce the resistance applied by first spring 154 and second, spring 156 on compressible sleeve 150. It will be understood that compressible sleeve 150 may provide resistance to the rotation of shaft 130 and that first spring 154 and second spring 156 may increase the resistance to rotation of shaft 130 when first securing member 110 is rotated along first direction 135. In some implementations, first securing member 110 may be secured to an upright member and second securing member 115 may be secured to a base member such that a compressive force applied to shaft 130 by compressible sleeve 150, first spring 154, and second spring 156 may maintain the upright member in an approximately vertical position relative to a supporting surface on which the base member may be disposed. The upright member and base member may support another device or may be integrated into another device to support the device, for example, the upright member and base member may support an electronic device, such as, a display, a tablet computer, a mobile phone, a smartphone, an all-in-one computer, a notebook computer, a television, etc. In another example, the upper member may support any other object, such as, a painting, artwork, etc.

Figure 4:
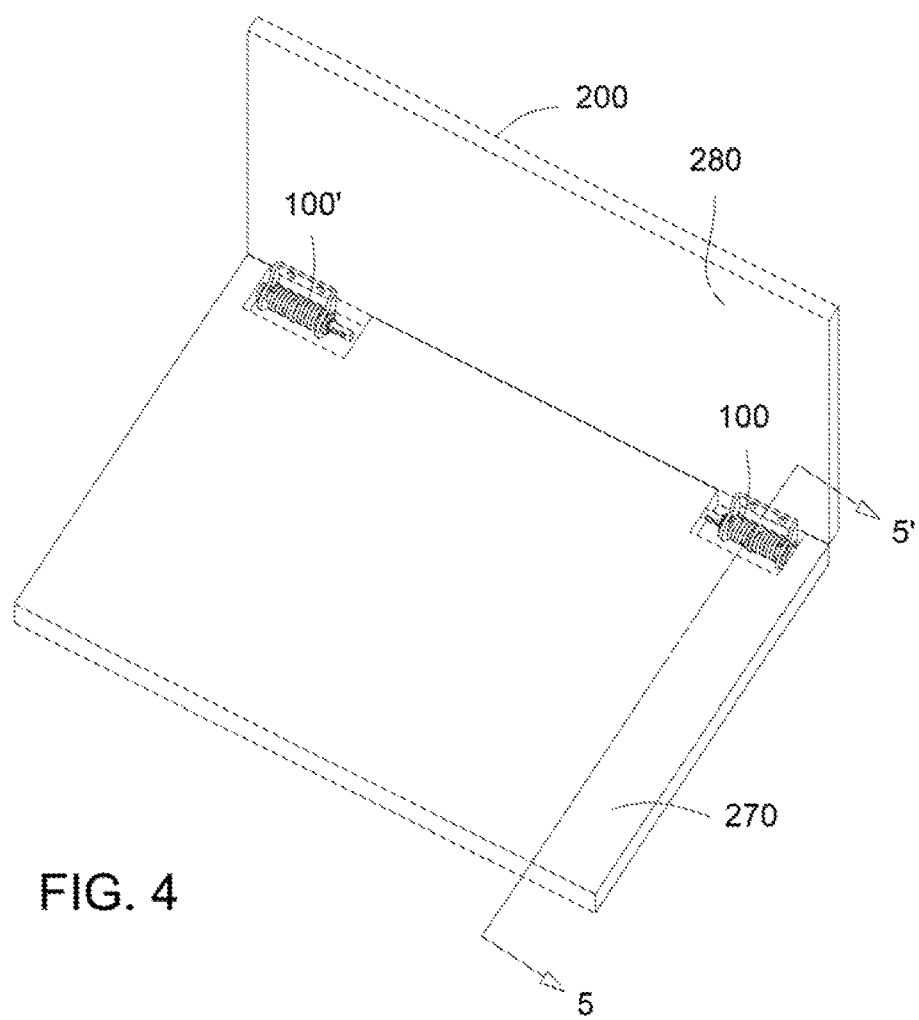
FIG. 4 is a schematic front perspective view of the hinge assembly of FIG. 1 in a device according to an example.
Figure 5:
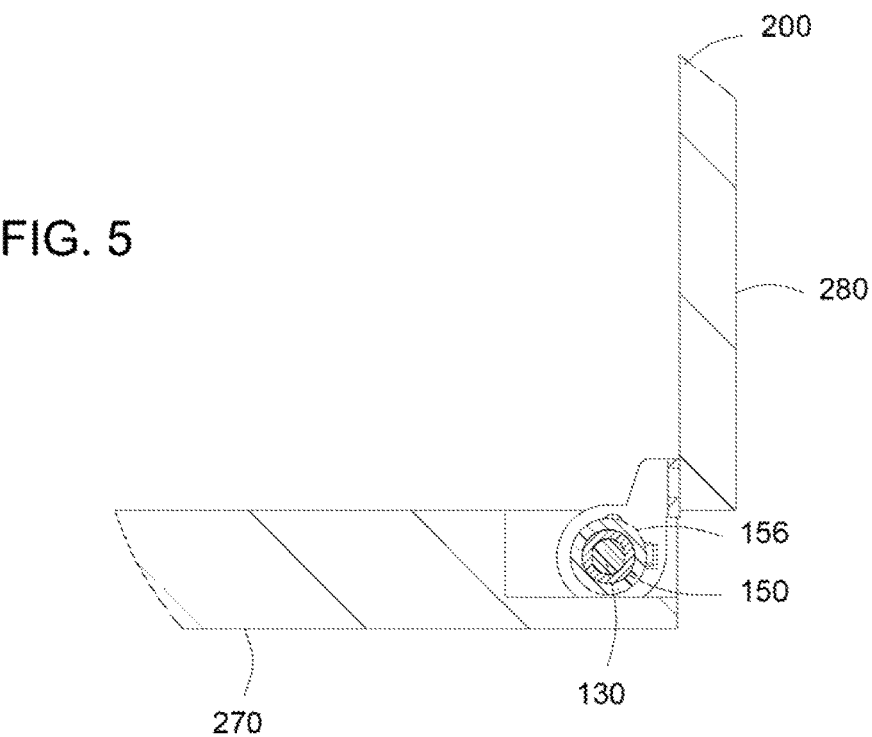
FIG. 5 is a schematic cross-sectional view of the hinge assembly of FIG. 4 taken along 5-5' according to an example.

FIG. 4 illustrates a schematic front perspective view of the hinge assembly 100 in a device 200. FIG. 5 illustrates a schematic cross-sectional view of hinge assembly 100 taken along 5-5' of FIG. 4. Device 200 may be an electronic device, such as a computing device, which includes a display portion 280 coupled to a base portion 270 via hinge assembly 100 and hinge assembly 100'. Hinge assembly 100 and hinge assembly 100' may be similar to hinge assembly 100 of FIGS. 1-3. Hinge assembly 100 and hinge assembly 100' may be disposed in device 200 such that a compressive force is applied to the shaft 130 of hinge assembly 100 and the shaft of hinge assembly 100' to resist rotation of the display portion 280 towards the base portion 270 in a counter-clockwise direction.

As shown in FIG. 5, an outer dimension of shaft 130 may be mated to an inner dimension of compressible sleeve 150. Compressible sleeve 150 may receive a compressive force from spring 156 when display portion 280 is rotated towards base portion 270 in a counter-clockwise direction. Similarly, the compressive force applied to compressible sleeve 150 by spring 156 of hinge assembly 100 may be reduced when display portion 280 is rotated away from base portion 270 in a clockwise direction. The compressive force on shaft 130 may provide a torque to counter a torque applied on display portion 280 by the force of gravity. As such, display portion 280 may be securely held at an angle with respect to base portion 270 by hinge assembly 100. It will be understood that the spring constant of the springs in hinge assembly 100 and hinge assembly 100' may be related to the weight of display portion 280. In an example, the spring constant of the hinge assembly 100 and hinge assembly 100' may be chosen to maintain display portion 280 upright with respect to base portion 270 when display portion 280 forms an angle in a certain range with base portion 270. For example, display portion 280 may be held upright in a 5-175 degree angle range with respect to base portion 270.

Figure 6:
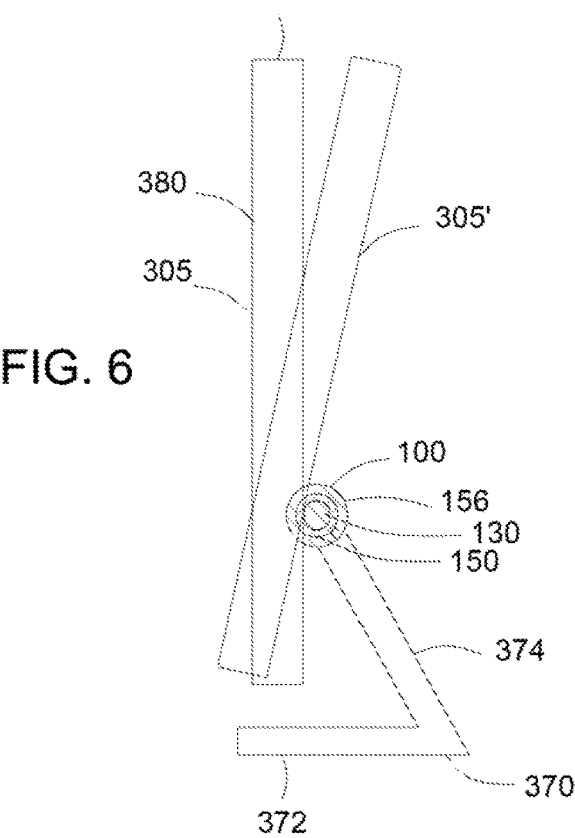
FIG. 6 is a schematic side view of the hinge assembly of FIG. 1 in a device according to an example.

FIG. 6 illustrates a schematic side view of the hinge assembly 100 in a device 300. Device 300 may be an electronic device, such as a display, a television, etc., which includes an upper member 380 coupled to a base member 370 via hinge assembly 100 to allow upper member 380 to rotate from a first position 305 to a second position 305'. Base member 370 includes base 372 and upper portion 374. Hinge assembly 100 is coupled to upper portion 374 of base member 370 and upper member 380. Hinge assembly 100 may be similar to hinge assembly 100 of FIGS. 1-3. As described above with respect to FIG. 4-5, hinge assembly 100 may be disposed such that a compressive force is applied to the shaft 130 of hinge assembly 100 to resist rotation of upper portion 380 in a counter-clockwise direction towards position 305 and to reduce the applied compressive force to shaft 130 when upper member 380 is rotated in a clockwise direction towards position 305'.

Figure 7:
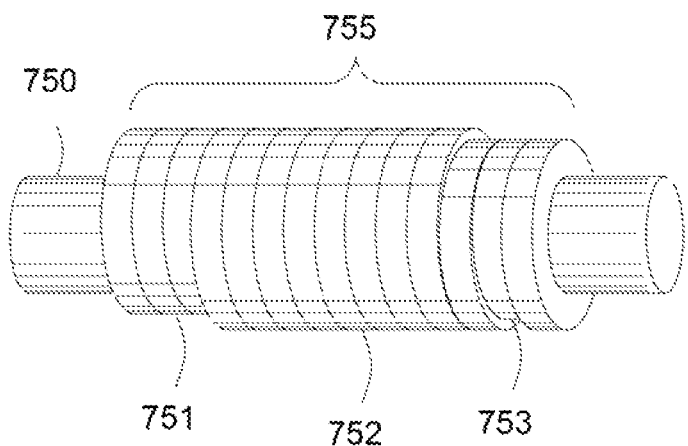
FIG. 7 is a schematic side view of a spring and a compressible sleeve according to an example.
Figure 8:
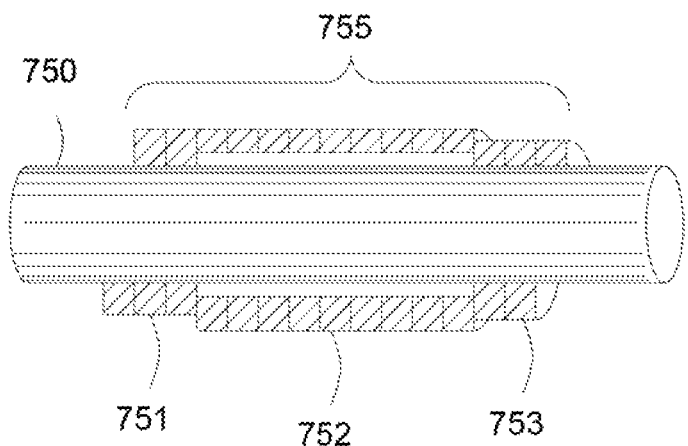
FIG. 8 is a partial sectional view of the spring and the compressible sleeve of FIG. 7 according to an example.

FIG. 7 illustrates a schematic front perspective view of a spring 755 and a compressible sleeve 750. FIG. 8 illustrates a partial sectional view of spring 755 and compressible sleeve 750. In particular, FIG. 8 depicts a partial sectional view of spring 755 disposed over compressible sleeve 750. Spring 755 and compressible sleeve 750 may be used to form resistance member 140, as described above with reference to FIGS. 1-3. As described above with respect to compressible sleeve 150, an inner dimension of compressible sleeve 750 may be mated to shaft 130. However, unlike FIGS. 1-3, an inner dimension of spring 755 is not uniform. In examples, a length of spring 755 may be less than a length of compressible sleeve 750 to allow spring 755 to be disposed fully on compressible sleeve 750.

In an example, spring 755 includes a first coil portion 751, a second coil portion 752, and a third coil portion 753. First coil portion 751 and third coil portion 753 may be dimensioned to mate with the outer surface of compressible sleeve 750. Second coil portion 752 may be dimensioned to not engage compressible sleeve 750 in an uncompressed state. In an example, when a rotational force is applied to spring 755, the force may reduce the diameter of second coil portion 752 to engage and compress compressible sleeve 750. It will be understood that spring 755 may be used to apply compressive force to compressible sleeve 750 to resist rotational motion in a first direction and reduce the compressive force on compressible sleeve 750 in second rotational direction opposite the first direction.

While certain implementations have been shown and described above, various changes in form and details may be made. For example, some features that have been described in relation to one implementation and/or process can be related to other implementations. In other words, processes, features, components, and/or properties described in relation to one implementation can be useful in other implementations. Furthermore, it should be understood that the systems, apparatuses, and methods described herein can include various combinations and/or sub-combinations of the components and/or features of the different implementations described. Thus, features described with reference to one or more implementations can be combined with other implementations described herein.

The above discussion is meant to be illustrative of the principles and various examples of the present disclosure. Numerous variations and modifications will become apparent to those skilled in the art once the above disclosure is fully appreciated. It is intended that the following claims be interpreted to embrace all such variations and modifications.

What is claimed is:

1. A device assembly comprising:
a base member coupled to an upright member via a hinge assembly, the hinge assembly including:
a first securing member;
a second securing member including a shaft coupled to the first securing member;
a compressible sleeve composed of elastically deformable material and arranged to engage and apply a compressive force to the shaft under influence of a spring; and
the spring coupled to the first securing member and to engage the compressible sleeve and apply a compressive force on the sleeve in response to a rotational movement of the hinge assembly in a first direction and reduce a compressive force when the hinge assembly is rotated in a second direction.

2. The device of claim 1, wherein the compressible sleeve is a plastic sleeve.

3. The device of claim 1, wherein a length of the spring is less than a length of the compressible sleeve.

4. The device of claim 1, wherein the compressible sleeve is to provide a resistance to movement of the hinge in the first direction.

5. The device of claim 1, wherein a spring constant of the spring is based on the weight of the upright member and an electronic device coupled to the upright member.

6. The device of claim 1, wherein the spring comprises a first spring and a second spring with only a washer disposed on the shaft between the first and second springs.

7. The device of claim 1, wherein the shaft does not have a circular cross-section inside the compressible sleeve, the compressible sleeve dimensioned to engage an outer surface of the shaft.

8. The device of claim 1, wherein the spring is a continuous coil, but an inner diameter of the spring is non-uniform along a length of the spring.

9. The device of claim 1, wherein the compressible sleeve is made of rubber.

10. A hinge assembly comprising:
a first U-shaped securing member coupled to an upright member including a first hole and second hole on opposite walls of the U-shaped securing member;
a second securing member coupled to a base member including a shaft threaded through the first hole and the second hole of the U-shaped securing member;
a compressible sleeve to engage the shaft; and
a spring coupled to the first U-shaped securing member to engage the compressible sleeve and to apply a first resistance to movement of the first U-shaped securing member in a first direction and a second resistance to movement of the first U-shaped securing member in a second direction, the resistance being based on a compressive force applied to the sleeve by the spring;
wherein the spring includes more than one coil, the coils arranged sequentially along a length of the compressible sleeve, and an inner diameter of a first coil of the spring is less than an inner diameter of second coil of the spring and the second coil does not engage an outer surface of the compressible sleeve.

11. The hinge assembly of claim 10, wherein the first resistance to movement of the first U-shaped member increases as the first U-shaped member is rotated in the first direction and the second resistance to movement of the first U-shaped member decreases as the first resistance member is rotated in the second direction.

12. The hinge assembly of claim 10, wherein a length of the spring is less than a length of the compressible sleeve.

13. The hinge assembly of claim 10, wherein the upright member is to engage an electronic device.

14. The hinge assembly of claim 10, wherein when the first U-shaped securing member is rotated in the first direction the inner diameter of the second coil is reduced such that the second coil is to compress the compressible sleeve.

15. A device assembly comprising:
a base member coupled to an upright member via a hinge assembly, the hinge assembly including:
a first securing member;
a second securing member including a shaft coupled to the first securing member;
a compressible sleeve to engage the shaft; and
a spring coupled to the first securing member and to engage the compressible sleeve and apply a compressive force on the sleeve in response to a rotational movement of the hinge assembly in a first direction and reduce a compressive force when the hinge assembly is rotated in a second direction;
wherein the spring is a continuous coil, but an inner diameter of the spring is non-uniform along a length of the spring; and
wherein an inner diameter of the spring is larger at a central portion of the spring and smaller at both ends of the spring than at the central portion.

16. The device assembly of claim 15, wherein:
the first securing member being U-shaped and including a first hole and second hole on opposite walls of the U-shaped securing member;
the second securing member including a shaft threaded through the first hole and the second hole of the first U-shaped securing member;
and further comprising: a first washer on the shaft, the first washer having a flange inserted into an opening in first U-shaped securing member; and
a second washer on the shaft on a different side of the first U-shaped securing member from the first washer, the second washer also having a flange inserted into an opening in first U-shaped securing member;
wherein an inner diameter of the spring mated to the compressible sleeve is reduced in response to a rotational movement in a first direction and the inner diameter of the spring is to increase in response to a rotational movement in a second direction opposite the first direction.

17. The device of claim 16, the base member coupled to a display via the hinge assembly, wherein a spring constant of the spring is based on the weight of the display.

18. The device of claim 16, wherein a length of the spring is less than a length of the compressible sleeve.

19. The device of claim 18, wherein a compressive force applied to the shaft from the compressible sleeve when the hinge assembly is in a first position is able to maintain the display in an approximately vertical position relative to the base member.

* * * * *